United States Patent [19]
Kim

[11] Patent Number: 5,803,860
[45] Date of Patent: Sep. 8, 1998

[54] THREE MODE STEPLESS SPEED CHANGING DEVICE

[75] Inventor: Eui Han Kim, Kwangmung, Rep. of Korea

[73] Assignee: LG Cable Co., Ltd., Seoul, Rep. of Korea

[21] Appl. No.: 731,869

[22] Filed: Oct. 21, 1996

[30] Foreign Application Priority Data

Mar. 21, 1996 [KR] Rep. of Korea .................... 1996-7667

[51] Int. Cl.$^6$ ................................................. F16H 37/02
[52] U.S. Cl. .......................................... 475/215; 475/216
[58] Field of Search .................................. 475/216, 192, 475/110, 111, 112, 214, 215

[56] References Cited

U.S. PATENT DOCUMENTS

| | | | |
|---|---|---|---|
| 4,990,127 | 2/1991 | Roberts et al. ........................ | 475/212 |
| 5,020,384 | 6/1991 | Kraus ..................................... | 475/216 |
| 5,288,281 | 2/1994 | Perry ..................................... | 475/192 |
| 5,643,121 | 7/1997 | Greenwood et al. ................... | 475/214 |

FOREIGN PATENT DOCUMENTS 2274315  7/1994  United Kingdom .................... 475/216

*Primary Examiner*—Charles A. Marmor
*Assistant Examiner*—Sherry Lynn Estremsky
*Attorney, Agent, or Firm*—Darby & Darby

[57] ABSTRACT

A three mode stepless speed changing device is disclosed. The speed changing device of this invention maintains the operational performance expected by a four mode stepless speed changing device. Because one clutch, two gears and their associated elements, which are necessarily provided in the four mode device for performing the third mode of the four modes, are removed from the three mode device of this invention, the device of this invention has a simple construction. The device of this invention is also free from pressurized oil passages, which are necessary for performing the third mode of the four mode device. In this regard, the speed changing device of this invention is easily produced and assembled at low cost.

1 Claim, 2 Drawing Sheets

THREE MODE STEPLESS SPEED CHANGING DEVICE

BACKGROUND OF THE INVENTION

1. Field of the Invention

The present invention relates in general to stepless speed changing devices used for transmitting torque while changing the rotating speed within the full speed range without any intermission and, more particularly, to a structural improvement in such speed changing devices for simplifying the construction of the speed changing device thus being easily produced and assembled at low cost, while maintaining the operational performance expected by a known four mode stepless speed changing device.

2. Description of the Prior Art

As well known to those skilled in the art, a stepless speed changing device is used for transmitting torque while charging the rotating speed within full speed range without any intermission. The stepless speed changing device generally has two parts, that is, a stepless speed changing unit and a summarizer composed of an epicycloidal gear train.

Typically, the stepless speed changing device is selectively operated between two modes (low and high speed modes) to transmit input torque to an output shaft while changing the rotating speed. However, when the two mode speed changing device (hereinbelow, referred to simply as "two mode device") is continuously operated with a high load in the low speed mode, both the summarizer and the speed changing unit are overloaded. In this regard, the two mode device must have a large enough size to resist the overload applied to the summarizer and speed changing unit, but this is almost impossible to design for practical use.

In an effort to overcome the above problems caused by the two mode device, Korean Patent Appln. No. 96-144 (filed on Jan. 6, 1996, and incorporated specifically herein by reference) discloses a stepless speed changing device, which is operated between three or four modes and reduces the load applied to both the summarizer and the speed changing unit. In the above Korean stepless speed changing device, the fourth mode may be eliminated from the four modes when the device is operated between the three modes. However, the four mode device has a problem in that it has a complex construction and is very difficult to produce and assemble thus increasing the manufacturing cost. On the other hand, the three mode device regrettably reduces the full speed range and has an inferior operational performance.

SUMMARY OF THE INVENTION

It is, therefore, an object of the present invention to provide a three mode stepless speed changing device in which the above problems can be overcome and which is operated between three modes, equal to the first, second and fourth modes of the four mode device disclosed in the cited reference, thus simplifying the construction and being easily produced and assembled at low cost while maintaining the operational performance expected by the four mode device.

In order to accomplish the above object, a stepless speed changing device according to the preferred embodiment of this invention has a stepless speed changing unit and a summarizer and converts its operational mode by a clutching motion in a synchronous speed condition to transmit input torque to an output shaft while changing rotating speed. The device also includes first and second gears, which are fixedly and rotatably fitted over a torque input shaft and a driven shaft, respectively. The second gear is selectively clutched by a first clutch in order to convert the operational mode into a first mode and to transmit the input torque to the output shaft through the summarizer. The stepless speed changing unit is mounted to the input shaft and transmits the input torque to the drive shaft connected to the summarizer by power transmission means. The power transmission means is composed of a first sprocket rotatably, which is fitted over the input shaft in a changed speed output part of the stepless speed changing unit. A second sprocket is fixedly fitted over the driven shaft and is connected to the first sprocket by a chain. The summarizer is mounted to the driven shaft and has an epicycloidal gear train. The gear train of the summarizer is composed of a planetary gear carrier, which is transmitted with the input torque from the second gear in the first mode. A sun gear is fixed to the driven shaft and gears into the planetary gear. A ring gear gears into the planetary gear. A third gear is rotatably fitted over the driven shaft and is fixed to the ring gear. Fourth and fifth gears are rotatably fitted over the driven shaft and are selectively clutched by second and third clutches in order to convert the operational mode into second and third modes, respectively. Sixth, seventh and eighth gears are fixed to an intermediate shaft and gear into the third and fifth gears of the driven shaft, respectively, while the eighth gear gears into the fourth gear of the driven shaft.

DESCRIPTION OF THE PREFERRED EMBODIMENTS

Figure 1A:
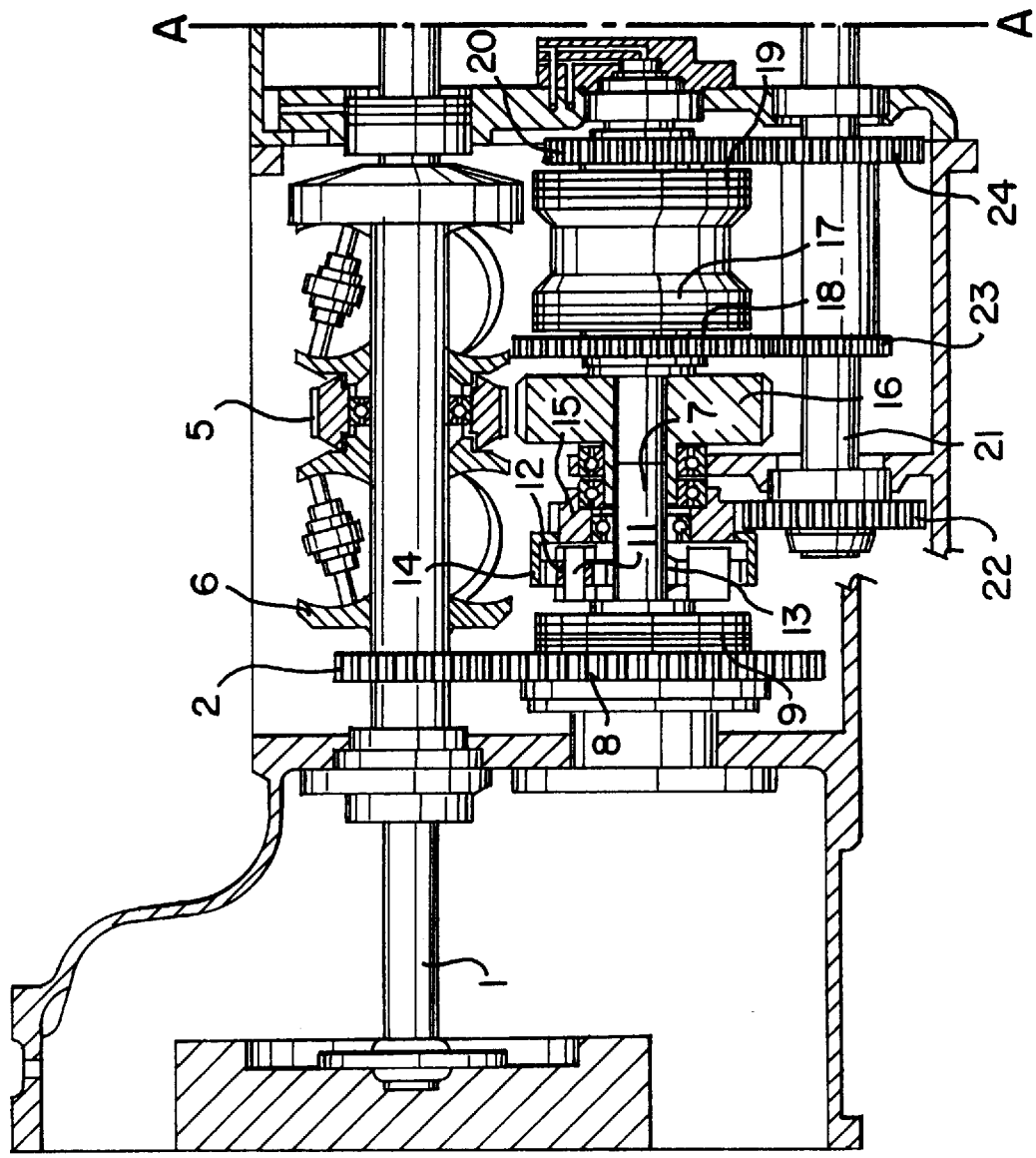
FIG. 1A is a partial sectional plan view with match line A—A showing the construction of the three mode stepless speed changing device.
Figure 1B:
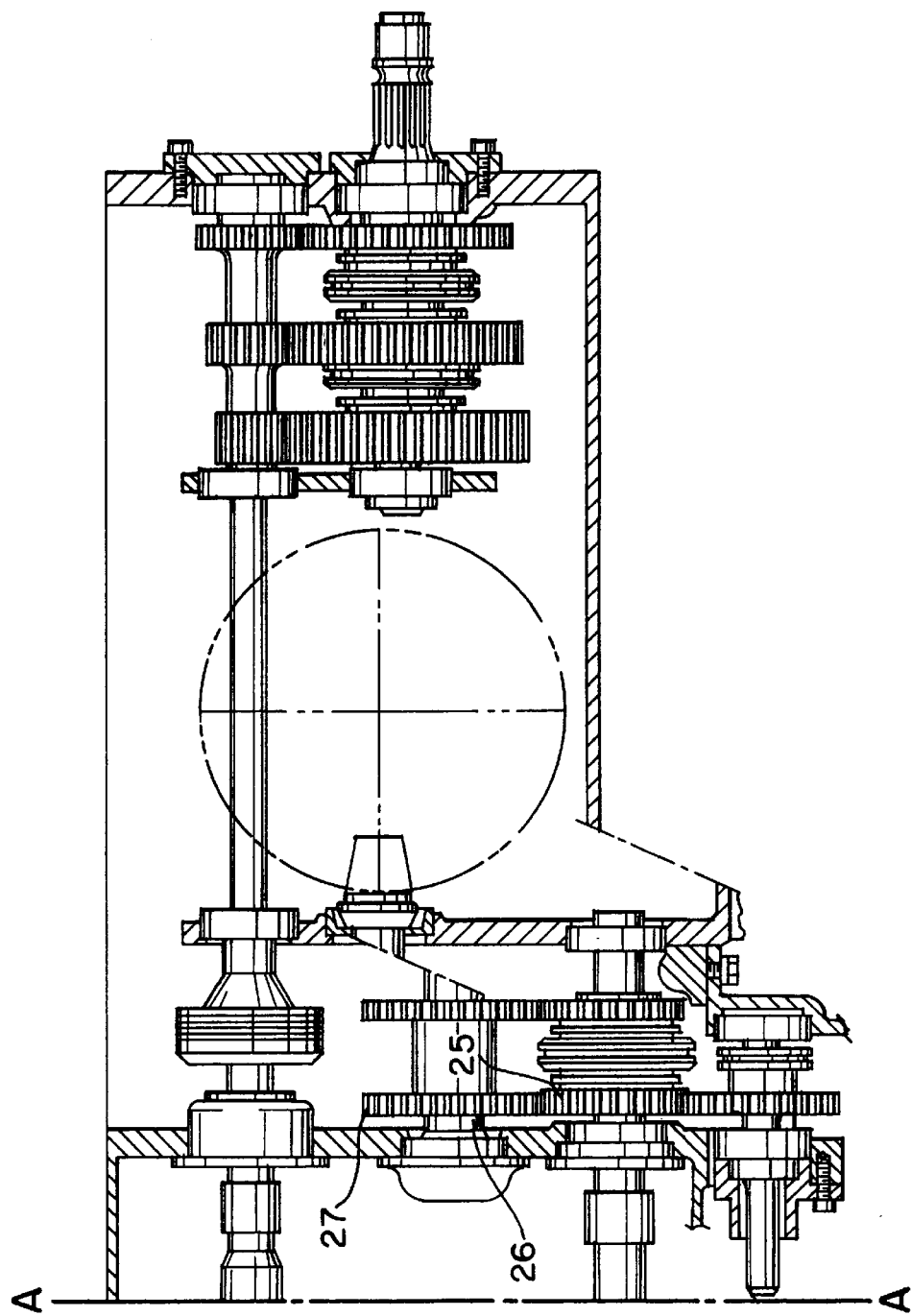
FIG. 1B is a partial sectional plan view of the three mode stepless speed changing unit of the invention with match line A—A.

The accompanying drawing shows the construction of the three mode stepless speed changing device in accordance with the preferred embodiment of the present invention.

A torque input shaft of the speed changing device of this invention is designated by the numeral 1 in the drawing. The input shaft 1 axially extends in the speed changing device. Fixedly fitted over one end portion of the above input shaft 1 is a first gear 2. In addition, a stepless speed changing unit 6 with a first sprocket 5 is mounted to the input shaft 1.

In the above speed changing device, a second or driven shaft 7 axially extends under the above input shaft 1. The second shaft 7 is spaced apart from and is parallel to the input shaft 1. The above driven shaft 7 includes a second gear 8, which is rotatably fitted over the shaft 7 and always gears into the first gear 2 of the input shaft 1 thus forming a first gear set. The above second gear 8 is selectively clutched by a first clutch 9 thereby selectively rotating with the first clutch 9. The speed changing device also includes a summarizer, which is composed of an epicycloidal gear train mounted to the driven shaft 7. In the above summarizer, a planetary gear carrier 11 is fixed to the first clutch 9, so that the carrier 11 is selectively rotated along with the second gear 8 when the first clutch 9 clutches the second gear 8. A planetary gear 12, which is carried by the above gear carrier 11, gears into a fixed sun gear 13. The sun gear 13 is fixed to the driven shaft 7. The above planetary gear 12 also gears into a ring gear 14. A third gear 15 is rotatably fitted over the second shaft 7 and is fixed to one side of the ring gear 14. The third gear 15 is thus selectively rotated along with the ring gear 14. Fixedly fitted over the second shaft 7 at a portion corresponding to the above first sprocket 5 is a second sprocket 16, which is connected to the first sprocket 5 by a chain. A fourth gear 20 is rotatably fitted over the second shaft 7 and is selectively clutched by a second clutch 19 in order to be rotated with the driven shaft 7. In addition, a fifth gear 18 is rotatably fitted over the above driven shaft 7 and is clutched by a third clutch 17. The third clutch 17 selectively clutches the fifth gear 18 in order to rotate the fifth gear 18 along with the driven shaft 7.

A third or intermediate shaft 21 axially extends under the second shaft 7. The intermediate shaft 21, which is spaced apart from and is parallel to the above driven shaft 7, has a plurality of gears 22, 23 and 24. The above gears 22, 23 and 24 are fixed to the intermediate shaft 21. The sixth and seventh gears 22 and 23 gear into the third and fifth gears 15 and 18 of the driven shaft 7, respectively. Meanwhile, the eighth gear 24 gears into the fourth gear 20 of the driven shaft 7. In addition, a ninth gear 25 is fixed to the output portion of the above intermediate shaft 21.

A torque output shaft 26 axially extends above the output portion of the intermediate shaft 21. The above output shaft 26 is spaced apart from and is parallel to the intermediate shaft 21. A tenth gear 27 is fixed to the output shaft 2 6 and gears into the ninth gear 25 of the intermediate shaft 21. Therefore, the torque of the intermediate shaft 21 is transmitted to the output shaft 26 through the gears 25 and 27 prior to being output from the output shaft 26. The speed changing device having the above construction converts its operational mode between three modes, first to third modes, as follows.

When the first clutch 9 is operated, the clutch 9 clutches the second gear 8, so that the speed changing device of this invention enters into its first mode.

In the first mode, the speed changing device transmits the input torque of the input shaft 1 through first gear 2→4 second gear 8→first clutch 9→planetary gear carrier 11→4 planetary gear 12→sun gear 13→driven shaft 7→second sprocket 16→chain (not shown)→first sprocket 5→stepless speed changing unit 6. At the above speed changing unit 6, the torque returns to the first gear 2. In the above first mode, the planetary gear 12 of the summarizer also transmits the torque to the ring gear 14. The torque of the ring gear 14 in turn is transmitted to the output shaft 26 through the third gear 15→sixth gear 22→intermediate shaft 21→ninth gear 25→tenth gear 27 of the output shaft 26. The torque is, thereafter, output from the output shaft 26.

Both the gear ratio of the first and second gears 2 and 8 and the gear ratio of the summarizer are determined to make the changed rotating speed of not higher than zero at a time the speed change ratio of the speed changing unit 6 increases the rotating speed to the maximum. When the reduction gear ratio of the speed changing unit 6 in the above state is increased to reduce the output speed of the unit 6, the rotating speed of the sun gear 13 is reduced. However, the rotating speed of the intermediate shaft 21 in the above state is increased. When the stepless speed change ratio of unit 6 is at the maximum ratio, the maximum speed in the first mode is achieved. The rotating speed of the driven shaft 7 in the above state is equal to that of the ring gear 14 of the summarizer's epicycloidal gear train. That is, the driven shaft 7 and the ring gear 14 have a synchronous speed. Even though the second clutch 19 in the above state clutches the fourth gear 20, the torque is smoothly transmitted without any problems because the gear ratio of the third and sixth gears 15 and 22 is equal to that of the fourth and eighth gears 20 and 24.

When operating the second clutch 19 while stopping the first clutch 9 at the synchronous speed condition during the above first mode, the second clutch 19 clutches the fourth gear 20, and the operational mode of the speed changing device is converted into the second mode. In the above second mode, the torque of the input shaft 1 is directly transmitted to the shaft 7 through the speed changing unit 6 without passing through the epicycloidal gear train (composed of the planetary gear 12, sun gear 13 and ring gear 14) of the summarizer. That is, the torque of the input shaft 1 is transmitted to the driven shaft 7 through the first and second sprockets 5 and 16. The torque of the driven shaft 7 in turn is transmitted to the intermediate shaft 21 through the second clutch 19 and fourth and eighth gears 20 and 24. The torque of the intermediate shaft 21 is, thereafter, transmitted to the output shaft 26 through the ninth and tenth gears 25 and 27 prior to being output. When the reduction gear ratio of the speed changing unit 6 in the second mode is reduced, the rotating speed of the output shaft 26 is increased. When the stepless speed change ratio is at the maximum speed increasing the ratio, the speed changing device achieves the maximum speed in the second mode.

When the third clutch 17 is operated while stopping the second clutch 19, the speed changing device of this invention enters into its third mode, which is equal to the fourth mode of the four mode stepless speed changing device disclosed in the cited reference, Korean Appln. No. 96-144. While converting the operational mode from the second mode into the third mode, the reduction gear ratio of the speed changing unit 6 is rapidly changed so as to equalize the rotating speed of the fifth gear 18, which is rotated by the input torque transmitted thereto through fourth gear 20→eighth gear 24→seventh gear 23→fifth gear 18, with the rotating speed of the driven shaft 7. In the above third mode, the torque of the input shaft 1 is transmitted to the output shaft 26 through the speed changing unit 6→third clutch 17→fifth gear 18→seventh gear 23→intermediate shaft 21→ninth gear 25→tenth gear 27 of the output shaft 26. There may be a timing retardation while the second mode is converted into the third mode. However, the output shaft 26 during the timing retardation is rotated at a high speed and has a high inertia energy, so that such timing retardation may be negligible in the practical use of the speed changing device. In order to transmit the torque while reducing the rotating speed, the clutches of the speed changing device of this invention are operated in inverted order.

The above speed changing device continuously transmits the torque of the input shaft to the output shaft without any intermission except for the timing of converting the second mode into the third mode, and changes the rotating speed between the minimum speed of not higher than zero and the maximum speed. When the minimum speed in the first mode is set as zero, the stepless speed changing device with a reverse gear smoothly converts its operational mode between reverse and forward drive modes at the zero speed condition. The rotating speed in the reverse drive mode may be increased or reduced in the same manner as described for the forward drive mode.

As described above, the present invention provides a stepless speed changing device that converts its operational mode between three modes, which are equal to the first, second and fourth modes of the four mode stepless speed changing device disclosed in the cited reference, Korean Appln. No. 96-144. The speed changing device of this invention maintains the operational performance expected by the four mode stepless speed changing device of the cited reference. Because one clutch, two gears and their associated elements, which are necessarily provided in the four mode device for performing the third mode, are removed from the three mode device of this invention, the device of this invention has a simple construction. The device of this invention is also free from the pressurized oil passages, which are necessary for performing the third mode of the four mode device. In this regard, the speed changing device of this invention is easily produced and assembled at low cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed:

1. A three operational mode stepless speed changing device having a stepless speed changing unit and a summarizer and converting the operational mode by a clutching motion in a synchronous speed condition to transmit input torque to an output shaft while changing a rotating speed, wherein the improvement comprises:

first and second gears fixedly and rotatably fitted over a torque input shaft and a driven shaft, respectively, said second gear being selectively clutched by a first clutch in order to convert the operational mode into a first mode and to transmit the input torque to the output shaft through the summarizer;

the stepless speed changing unit mounted to the input shaft and adapted for transmitting the input torque to the driven shaft connected to the summarizer by power transmission means composed of:

a first sprocket rotatably fitted over said input shaft in a changed speed output part of the stepless speed changing unit; and a second sprocket fixedly fitted over said driven shaft and connected to said first sprocket by a chain;

the summarizer mounted to said driven shaft and having an epicycloidal gear train composed of:

a planetary gear carrier transmitted with the input torque from the second gear in the first mode;

a sun gear fixed to the driven shaft and gearing into a planetary gear;

a ring gear gearing into said planetary gear; and a third gear rotatably fitted over the driven shaft and fixed to said ring gear;

a fourth and fifth gears rotatably fitted over said driven shaft, said fourth and fifth gears being selectively clutched by second and third clutches in order to convert the operational mode into second and third modes, respectively; and sixth, seventh and eighth gears fixed to an intermediate shaft, said sixth and seventh gears gearing into said third and fifth gears of the driven shaft, respectively, while said eighth gear gearing into the fourth gear of the drive shaft.

* * * * *

UNITED STATES PATENT AND TRADEMARK OFFICE
CERTIFICATE OF CORRECTION

PATENT NO. : 5,803,860
DATED : September 8, 1998
INVENTOR(S) : Eui Han KIM

It is certified that error appears in the above-identified patent and that said Letters Patent is hereby corrected as shown below:

On the title page: Item

, [30], Foreign Application Priority Data, change "1996-7667" to --96-7667--.

Signed and Sealed this

Twenty-seventh Day of April, 1999

Attest:

Q. TODD DICKINSON

Attesting Officer          Acting Commissioner of Patents and Trademarks